United States Patent
Ma et al.

(10) Patent No.: US 11,218,862 B1
(45) Date of Patent: Jan. 4, 2022

(54) DEVICE, SYSTEM AND METHOD FOR TRANSITIONING A PUBLIC-SAFETY ANSWERING POINT TO AN AUTOMATED REVIEW MODE

(71) Applicant: MOTOROLA SOLUTIONS, INC., Chicago, IL (US)

(72) Inventors: Min Ma, Chicago, IL (US); Janet A. Manzanares, Chicago, IL (US); Parveen Gupta, Chicago, IL (US); Brian J. Frommelt, Chicago, IL (US); Pawel Sadowski, Cracow (PL)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 17/173,447

(22) Filed: Feb. 11, 2021

(51) Int. Cl.
*H04W 4/90* (2018.01)
*H04W 76/50* (2018.01)
*H04M 3/51* (2006.01)

(52) U.S. Cl.
CPC .......... *H04W 4/90* (2018.02); *H04M 3/5116* (2013.01); *H04W 76/50* (2018.02); *H04M 2242/04* (2013.01)

(58) Field of Classification Search
CPC ..... H04W 4/90; H04W 76/50; H04M 3/5116; H04M 2242/04
See application file for complete search history.

(56) References Cited

U.S. PATENT DOCUMENTS

| | | |
|---|---|---|
| 9,420,099 B1 | 8/2016 | Krishnan et al. |
| 10,044,857 B2 | 8/2018 | Philbin |
| 10,560,575 B2 | 2/2020 | Segalis et al. |
| 2005/0002516 A1* | 1/2005 | Shtivelman ........... H04M 3/523 379/309 |
| 2017/0289350 A1* | 10/2017 | Philbin ................. H04L 67/146 |
| 2017/0324868 A1* | 11/2017 | Tamblyn ................ H04M 3/58 |
| 2017/0358296 A1* | 12/2017 | Segalis ................. G10L 15/222 |
| 2018/0353085 A1 | 12/2018 | Olivero |
| 2019/0174289 A1* | 6/2019 | Martin .................... H04L 67/18 |
| 2019/0313230 A1* | 10/2019 | MacGabann ........... H04L 67/28 |
| 2019/0379788 A1* | 12/2019 | Bondareva .......... H04M 3/4285 |
| 2020/0244605 A1* | 7/2020 | Nagaraja ................. H04L 67/16 |

\* cited by examiner

*Primary Examiner* — Minjung Kim
(74) *Attorney, Agent, or Firm* — Perry + Currier

(57) ABSTRACT

A device, system and method for transitioning a public-safety answering point (PSAP) to an automated review mode is provided. A device is configured to: operate in a manual mode, in which calls are routed to users for manual incident data entry; detect an overload condition, in which a number of calls exceeds an ability of users to handle the calls; in response to detecting the overload condition, transition from the manual mode to an automated review mode, in which: calls are routed to one or more bots for automated incident data entry; and incident indicators, parsed from the calls by bots, are rendered at a display screen for review by a user; and in response to detecting that a bot-generated particular incident indicator meets a low confidence condition, change a rendered characteristic of the bot-generated particular incident indicator to indicate that the user is to intervene.

20 Claims, 7 Drawing Sheets

Universal status monitor

| Incident # ↓ | Type | Priority | Status | Timer | Unit # | Address | Phone number | Phone status |
|---|---|---|---|---|---|---|---|---|
| ▸ Requires action (2) 500-1 | | 502 | | | | | | |
| DC-000131 | ? | 1 | Active | 32:56 | U107 | 3778 Linda Street | 678-460-8433 | ● In progress |
| DC-000244 | NC | 1 | Active | 06:01 | U505 | ? 500-2 | 516-250-9108 | ● In progress |
| ▸ Requires attention (3) 500-3 | | | | | | | | |
| DC-000034 | ACC | 1 | Active | 16:35 | U242 | 1420 Bloomfield Way | 412-731-3957 | ● In progress |
| DC-000066 | FIRE | 1 | Active | 05:11 | F001 500-4 | 478 Levy Court | 610-247-0847 | ● In progress |
| DC-000115 | ACC | 1 | Pending 500-5 | 11:12 | | 4027 Sharon Lane | 415-268-2535 | Released |
| ▸ Other (2) | | | | | | | | |
| DC-000030 | TS | 1 | Active | 33:16 | U27 | 2081 Park Avenue | 803-465-0184 | SMS |
| DC-000035 | ACC | 1 | Active | 15:10 | U22 | 1851 Bell Street | 415-605-1795 | ● In progress |

Universal status monitor

| Incident # ↓ | Type | Priority | Status | Timer | Unit # | Address | Phone number | Phone status |
|---|---|---|---|---|---|---|---|---|
| ▸ Other (7) | | | | | | | | |
| DC-000131 | DV | 1 | Active | 32:56 | U107 | 3778 Linda Street | 678-460-8433 | ● In progress |
| DC-000244 | NC | 1 | Active | 06:01 | U505 | 1st And Main | 516-250-9108 | ● In progress |
| DC-000034 | ACC | 1 | Active | 16:35 | U242 | 1420 Bloomfield Way | 412-731-3957 | ● In progress |
| DC-000066 | MED | 1 | Active | 05:11 | M001 | 478 Levy Court | 610-247-0847 | ● In progress |
| DC-000115 | ACC | 1 | Active | 11:12 | U737 | 4027 Sharon Lane | 415-268-2535 | Released |
| DC-000030 | TS | 1 | Active | 33:16 | U27 | 2081 Park Avenue | 803-465-0184 | SMS |
| DC-000035 | ACC | 1 | Active | 15:10 | U22 | 1851 Bell Street | 415-605-1795 | ● In progress |

FIG. 7

DEVICE, SYSTEM AND METHOD FOR TRANSITIONING A PUBLIC-SAFETY ANSWERING POINT TO AN AUTOMATED REVIEW MODE

BACKGROUND OF THE INVENTION

Public-Safety Answering Point (PSAP) operation may include multiple human users in multiple roles, such as call takers, dispatchers (e.g., for one or more types of first responders such as police officers, fire fighters, emergency medical technicians, etc.), supervisors, and the like. In situations of critically low staffing or unusually high call and/or incident volume, or both (as may occur during a natural disaster, a major public-safety incident, etc.), or for other reasons, a PSAP may need to continue operation with significantly reduced staffing.

BRIEF DESCRIPTION OF THE SEVERAL VIEWS OF THE DRAWINGS

In the accompanying figures similar or the same reference numerals may be repeated to indicate corresponding or analogous elements. These figures, together with the detailed description, below are incorporated in and form part of the specification and serve to further illustrate various embodiments of concepts that include the claimed invention, and to explain various principles and advantages of those embodiments.

FIG. 5 depicts a call status monitor used to review a plurality of calls in the automated review mode, in accordance with some examples.

FIG. 7 depicts the call status monitor of FIG. 5 after a human user has assigned and/or changed various incident indicators, in accordance with some examples.

Figure 1:
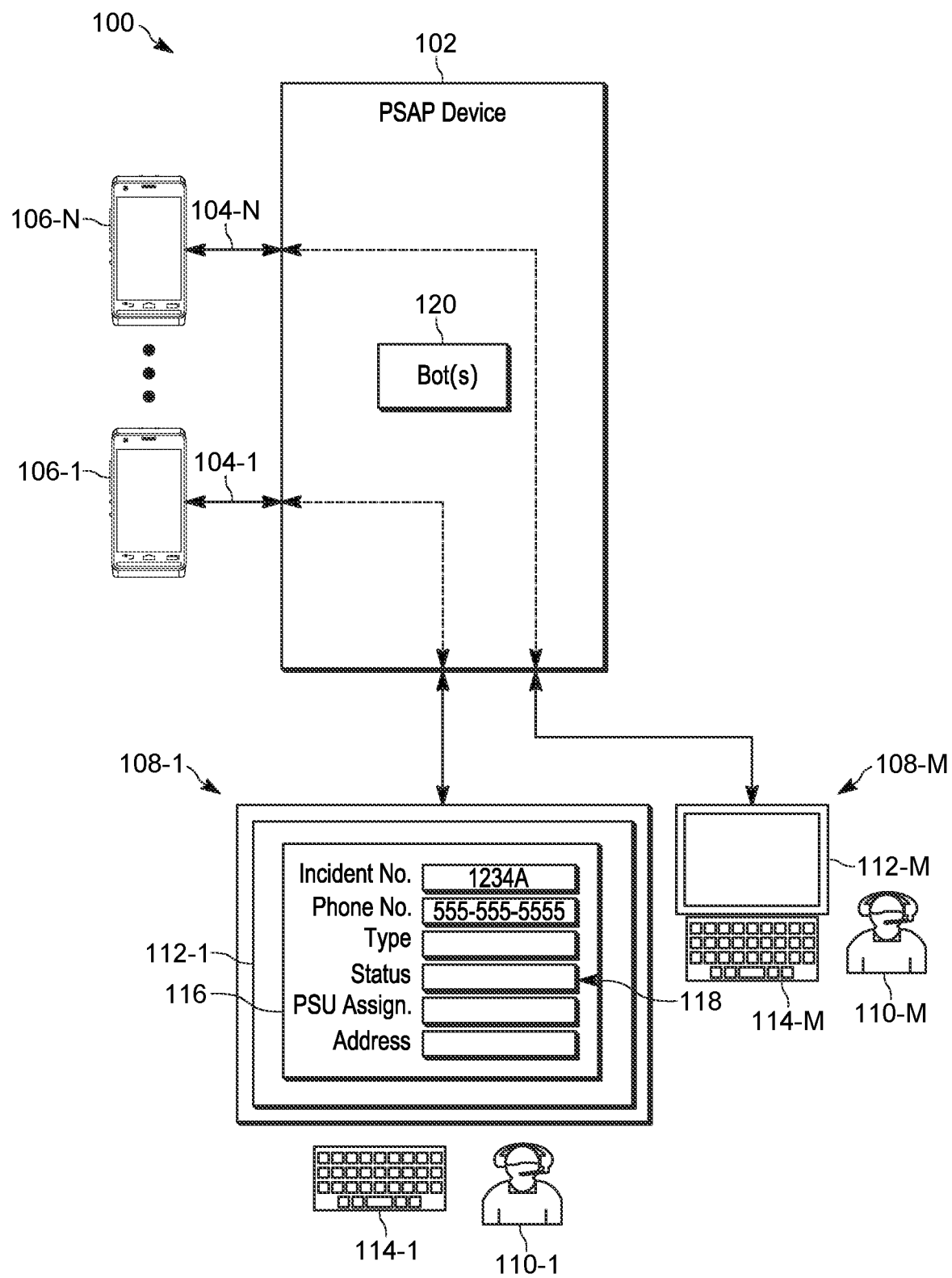
FIG. 1 is a system for transitioning a public-safety answering point to an automated review mode, in accordance with some examples.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present disclosure.

The system, apparatus, and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION OF THE INVENTION

Public-Safety Answering Point (PSAP) operation may include multiple human users in multiple roles, such as call takers, dispatchers (e.g., for one or more types of first responders such as police officers, fire fighters, emergency medical technicians, etc.), supervisors, and the like. In extreme situations of critically low staffing or unusually high call and/or incident volume, or both (as may occur during a natural disaster, a major public-safety incident, etc.), a PSAP may need to continue operation with significantly reduced staffing. Hence, there exists a need for an improved technical method, device, and system for transitioning a public-safety answering point to an automated review mode.

In particular, provided herein is a PSAP device, which may initially operate in a manual mode, in which calls are routed to human users, and, in particular, to communication devices operated by human users, for manual incident data entry by the human users, among other possibilities such as manual call answering and/or manual text answering, and the like. Due to a natural disaster, a major public safety incident, a staffing issue, among other possibilities, a number of the calls may exceed an ability of the human users to handle the calls; similarly, a number of incidents to be handled may exceed an ability of the human users to handle the incidents. Such conditions, among other possibilities where a number of calls may exceed an ability of the human users to handle the calls, are referred to herein as overload conditions. The PSAP device may be generally configured to detect such an overload condition and, in response, transition from the manual mode to an automated review mode, in which at least a portion of the calls are routed to one or more bots (e.g., automated call answer engines and/or bot engines, and the like) for automated incident data entry. In such an automated review mode, incident indicators, parsed from the calls, by the one or more bots, are rendered at a display screen for review by a human user, such as one of the human users that were initially answering calls in the manual mode; hence, a role of such a human user may also transition from a manual role, in which the human answers calls, to a bot supervisor role in which the human user reviews and/or manually corrects information determined by a bot (e.g., and which may include entering information which a bot does not detect). In particular, the PSAP device may detect in that a bot-generated particular incident indicator meets a low confidence condition and the PSAP device may change a rendered characteristic of the bot-generated particular incident indicator to indicate that the human user is to review, and possibly intervene, for example to manually correct information determined by a bot (e.g., and which may include entering information which a bot does not determine). Hence, the PSAP device may assign confidence levels to bot-determined information which indicate accuracy of entries (e.g., and/or lack of an entry) of a bot.

An aspect of the specification provides a method comprising: operating a public-safety answering point (PSAP) device in a manual mode, in which calls are routed to human users for manual incident data entry; detecting, at the PSAP device, an overload condition, in which a number of the calls exceeds an ability of the human users to handle the calls; in response to detecting the overload condition, transitioning the PSAP device from the manual mode to an automated review mode, in which: the calls are routed to one or more bots for automated incident data entry; and incident indicators, parsed from the calls by the one or more bots, are rendered at a display screen for review by a human user; and in response to detecting that a bot-generated particular incident indicator meets a low confidence condition, changing, via the PSAP device, a rendered characteristic of the bot-generated particular incident indicator to indicate that the human user is to intervene.

Another aspect of the specification provides a public-safety answering point (PSAP) device comprising: a communication unit; and a controller communicatively coupled to the communication unit, the controller configured to: operate in a manual mode, in which calls, received via the communication unit, are routed to human users for manual incident data entry; detect an overload condition, in which a number of the calls exceeds an ability of the human users to handle the calls; in response to detecting the overload condition, transition from the manual mode to an automated review mode, in which: the calls are routed, via the communication unit, to one or more bots for automated incident data entry; and incident indicators, parsed from the calls by the one or more bots, are rendered at a display screen for review by a human user; and in response to detecting that a bot-generated particular incident indicator meets a low confidence condition, change a rendered characteristic of the bot-generated particular incident indicator to indicate that the human user is to intervene.

Example embodiments are herein described with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a special purpose and unique machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus that may be on or off-premises, or may be accessed via the cloud in any of a software as a service (SaaS), platform as a service (PaaS), or infrastructure as a service (IaaS) architecture so as to cause a series of operational blocks to be performed on the computer or other programmable apparatus to produce a computer implemented process such that the instructions, which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

Further advantages and features consistent with this disclosure will be set forth in the following detailed description, with reference to the drawings.

Attention is directed to FIG. 1, which depicts an example system 100 for transitioning a public-safety answering point to an automated review mode. The various components of the system 100 are in communication via any suitable combination of wired and/or wireless communication links, and communication links between components of the system 100 are depicted in FIG. 1, and throughout the present specification, as double-ended arrows between respective components; the communication links may include any suitable combination of wireless and/or wired links and/or wireless and/or wired communication networks.

Herein, reference will be made to engines, such as automated call-answer engines and/or bot engines, which may be understood to refer to hardware, and/or a combination of hardware and software (e.g., a combination of hardware and software includes software hosted at hardware such that the software, when executed by the hardware, transforms the hardware into a special purpose hardware, such as a software module that is stored at a processor-readable memory implemented or interpreted by a processor), or hardware and software hosted at hardware and/or implemented as a system-on-chip architecture and the like.

The system 100 comprises a public-safety answering point (PSAP) device 102, which is interchangeably referred to hereafter as the device 102. The device 102, is generally configured to receive calls reporting incidents, such as public-safety incidents, and the like, on behalf of a PSAP, such as a 9-1-1 call-center, and the like.

For example, as depicted, an integer number of "N" calls 104-1 . . . 104-N, received from calling devices 106-1 . . . 106-N, are being received at the device 102. The calls 104-1 . . . 104-N are interchangeably referred to hereafter, collectively, as the calls 104, and, generically and/or individually, as a call 104; this convention will be used elsewhere in the present specification. For example, the calling devices 106-1 . . . 106-N are interchangeably referred to hereafter, collectively, as the calling devices 106 and, generically and/or individually, as a calling device 106.

As depicted, the calling devices 106 may comprise mobile devices, but the calling devices 106 may comprise any suitable communication device for making a call 104 to the device 102 including, but not limited to, the depicted mobile devices, public switched telephone network (PSTN) telephones, laptops, personal computers, and the like. Furthermore, a call 104 may occur via any suitable wireless or wired network and may include, but are not limited to, mobile phone calls, PSTN calls, Internet Protocol (IP) calls, calls made using applications, and the like.

However, in other examples a call 104 may be in a format other than a phone call, such as a text message, a short message service (SMS) message, multimedia messaging service (MMS) messages, video calls, and the like.

In particular, a user of a calling device 106 may initiate a call 104 using a number (e.g., "911") for the PSAP, for example to report an incident. The device 102 automatically receives and/or answers the call 104 thereby causing a communication link between the device 102 and a calling device 106 to be generated using any suitable combination of wired and/or wireless networks.

As depicted, the system 100 further comprises an integer number of "M" communication devices 108-1 . . . 108-M (e.g., communication devices 108 and/or a communication device 108) in communication with the device 102 via respective communication links. The communication devices 108 are operated by respective human users 110-1 . . . 110-M (e.g., human users 110 and/or a human user 110).

As depicted, the communication device 108 may comprise respective display screens 112-1 . . . 112-M (e.g., display screens 112 and/or a display screen 112) and one or more respective input devices 114-1 . . . 114-M (e.g., input devices 114 and/or an input device 114) such as keyboards (e.g., as depicted), pointing devices, and the like.

The communication devices 108 are further understood to comprise components for communicating with users of the calling devices 106 on the calls 104, such as speakers and/or microphones and the like (e.g., which may be provided, as depicted, as headsets worn by the human users 110). While not depicted, the communication devices 108 may optionally comprise cameras for communicating with users of the calling devices 106 on the calls 104.

In particular examples, the communication devices 108 may comprise dispatch terminals, personal computers, laptop computers, and/or the like, to which the device 102 may route a call 104, for example as represented by dashed double ended arrows between the calls 104 and communication links to the communication devices 108. In some examples, a communication device 108 may be physically located at a PSAP facility, while in other example a communication device 108 may be physically located at a remote location such as a home, and the like, of an associated human user 110 (e.g., in a work-from-home scenario).

Regardless, a human user 110 may answer a call 104 at a communication device 108. Such human users 110 may be in a call-taker role (e.g., such as a 9-1-1 call-takers and the like), however some of the human users 110 may be in supervisor role and/or a dispatcher role (e.g., to dispatch public-safety units to incidents, and the like) and/or some of the human users 110 may perform more than one role.

Hereafter, while calls 104 are described as being routed to the human users 110 for manual incident data entry, it is understood that such routing is to the communication devices 108, and the like.

In particular, in FIG. 1, it is understood that the device 102 is operating in a manual mode, in which calls are routed to the human users 110 for manual incident data entry. For example, as depicted, the device 102 and/or the communication device 108-1 is controlling the display screen 112-1 to provide (e.g., at least partially) a manual incident data entry mechanism 116 in conjunction with routing the call 104-1 to the communication device 108-1. The manual incident data entry mechanism 116 includes various fields 118, at which data may be manually entered via the human user 110-1 operating the input device 114-1. As depicted, some of the fields 118 may be automatically filled in by the PSAP device 102, such as an automatically assigned incident number, a phone number of the calling device 106-1, and the like. However, other fields 118, such as an incident "Type" field, an incident "Status" field, a public safety unit (PSU) assignment (PSU Assign.) field, in incident "Address" field, and the like, are understood to be manually filled in via the human user 110-1 operating the input device 114-1 as the human user 110-1 is talking to a user (not depicted) of the calling device 106-1 on the call 104-1. In some examples, the incident "Address" field may also be automatically determined, for example when the device 102 is implementing an enhanced 911 system, and the like, and/or an automatic location identification system and the like, and/or when a phone company and/or calling application (e.g., at a calling device 106) provides location information (e.g., as metadata on a call 104) that includes the address, and the like.

The information provided in the fields 118 may be referred to as incident indicators, which indicate information regarding an incident being reported via a call 104. In the manual mode, at least a portion of such incident indicators are determined and/or parsed from a call 104 by a human user 110, entered into the fields 118 via an input device 114, and rendered at a respective display screen 112. Furthermore, in the manual mode, a human user 110 is understood to handle a single call 104 at any given time. While not depicted, the mechanism 116 may include a free-form notes field and/or an incident narrative field and/or an incident description field, such that free-form manual text entry may be provided therein, for example by the human user 110.

While a similar manual incident data entry mechanism is not depicted at the display screen 112-M, such a manual incident data entry mechanism is understood to be provided at any of the display screens 112 when a call 104 is routed to a respective human user 110.

An "N" number of calls 104 and calling devices 106 are depicted in FIG. 1, which may be any suitable number, and which may vary over time, for example as incidents (e.g., public safety incidents), and the like, occur. Similarly, an "M" number of human users 110 (e.g., and communication devices 108) are depicted in FIG. 1, which may be any suitable number, and which may vary over time, for example as the human users 110 come onto a shift, or leave a shift, and the like. Ideally, there are a suitable number of "M" human users 110 that can handle the "N" number of calls 104. In some of these examples, when the number of calls 104 exceeds the number of human users 110, a portion of the calls 104 may be answered at the device 102, and placed into a queue (not depicted) at the device 102 to wait for an available human user 110.

However, in some examples, one or more overload conditions may occur at the device 102. In particular, an overload condition may occur when a number "N" of the calls 104 exceeds an ability of the human users 110 to handle the calls 104. Such an overload condition may occur, for example, when a natural disaster occurs and/or when a major public safety incident occurs, among other possibilities, and/or when the number "M" of the human users 110 is reduced due to sickness, the natural disaster (e.g., some of the human users 110 may not be able to make it to the PSAP and/or may have communications cut off to their communication devices 108 due to the natural disaster) and the like.

In some examples, an overload condition may comprise the number "N" of calls 104 being greater than the number "M" of human users 110. In other examples, an overload condition may comprise the number "N" of calls 104 being greater than the number "M" of human users 110 by a given amount, for example, 10% higher, 20% higher, 30% higher, among other possibilities. In further examples, an overload condition may comprise a queue at the device 102 including a given number of the calls 104. In yet further examples, an overload condition may comprise a wait time of a queue at the device 102 being above a threshold wait time (e.g., a wait time being understood to a time period between a call 104 being automatically answered at the device 102 and placed in a queue, and the call 104 being routed to a human user 110). However, any suitable overload condition, in which a number of the calls 104 exceeds an ability of the human users 110 to handle the calls 104, is within the scope of the present specification. For example, an overload condition may include a number of the actions and/or work items to be performed as a result of the calls 104 may exceed an ability of the human users 110 to handle; such actions and/or work items may include, but is not limited to, determining for each of the calls 104 an incident type, a PSU to be dispatched, and the like, as well as populating the fields 118, dispatching a PSU, and the like.

As will be explained in further detail below, when an overload condition is detected at the device 102, the device 102 may transition from the manual mode to an automated review mode, in which the calls 104, and/or at least a portion of the calls 104, are routed to one or more bots 120 for automated incident data entry. In particular, the one or more bots 120 (interchangeably referred to hereafter collectively as the bots 120 and generically/individually as a bot 120), may comprise automated call answer engines and/or bot engines, and the like, which are configured to answer the calls 104 and "talk" to users of the calling devices 106 such that incident indicators are parsed from the calls 104 by the one or more bots 120 and rendered at a display screen 112 for review by a human user 110.

For example, a bot 120 may include, and/or have access to, a speech-to-text engine, and the like, which converts speech, on a call 104, to text, for example to generate a transcript of the call 104; from such text and/or such a transcript, incident indicators such as an incident type, and the like, may be determined by a bot 120. However, transcripts of calls 104, as described herein, may alternatively (and/or additionally) include, but are not limited to, text to 9-1-1 transcripts (e.g., a transcript of a text and/or message based call 104). Such a bot 120 may then assign an appropriate PSU to an associated incident; for example, a law-related incident may have a police PSU assigned to the associated incident, a fire-related incident may have a fire-fighter PSU assigned to the associated incident, a medical-related incident may have an emergency medical technician (EMT) PSU assigned to the associated incident, and the like.

Such incident indicators determined by a bot 120 may be referred to as a bot-generated incident indicator.

However, a bot 120 may make errors in determining one or more incident indicators and/or a bot 120 may fail to determine an incident indicator. For example, a bot 120 may not be able to determine an incident type as a user of a calling device 106 may be slurring their words, which may not be properly converted to text, and/or a user of a calling device 106 may be using code words to report an incident that are not understood by a bot 120 (e.g., such as "pizza" to covertly report domestic violence on a 911 call, and the like). As such, in these examples, an incident type may not be determined; alternatively, an incident type may be determined, but a PSU assignment may be delayed and/or may be pending until a more accurate determination of an incident type occurs (e.g., which may lead to an incident status of "Pending", as opposed to "Active", which occurs when a PSU is assigned to an incident).

Similarly, a bot 120 may incorrectly assign a PSU to an incident, for example due to an incorrect determination of an incident type, and the like. In a particular example, a caller on a call 104 may be excited and mention a minor fire (e.g., a campfire), which lead to an injury and a bot 120 may assign a firefighter PSU to the incident when an EMT PSU may be more appropriate. In some of these examples, a bot 120 may initially assign an incident type of "Fire" to the incident, but later change the incident type to "Injury", and the like, and change a PSU assignment from a firefighter PSU to an EMT PSU. In yet further examples, a bot 120 may change an incident type more than once.

Any of these situations may indicate that incident indicators determined (or not) by a bot 120 for a call 104 may not be accurate, among other possibilities. For example, continuing with the example above, a bot 120 may correctly determine that an incident is a "Fire" incident type, but may not correctly determine a type of FIRE PSU to assign to the incident. For example, a "Fire" incident type may include a structure fire incident (e.g., a fire at a building), forest fire incident, a car fire incident, among other possibilities, which may respectively require different types of FIRE PSUs; for example, one FIRE PSU may include a pumper truck, while another FIRE PSU may include a ladder truck, while yet another FIRE PSU may include a specially equipped hazardous materials truck (e.g. for cleaning up hazardous materials) and/or team with special skills and/or training (e.g. related to hazardous materials), some of which may be appropriate for some fire incident types, but not appropriate for other fire incident types. For example, a FIRE PSU may include a ladder truck may not be appropriate for a forest fire incident type. Hence, while a given incident type for a call 104 might be quickly determined by a bot 120, the bot 120 may not quickly determine a type of PSU to dispatch, and/or may change (e.g., and/or continuously change) from PSU type to another, which may lead to delays in determining incident indicators and hence may also lead to delays in responding to an incident. However, any suitable situation, that may indicate that incident indicators determined, or not determined, by a bot 120 for a call 104 may not be accurate, is within the scope of the present specification.

As such, the device 102 assigns confidence levels to incident indicators associated with a call 104 answered by a bot 120. Such confidence levels indicate an accuracy and/or confidence that a given incident indicator is accurate.

In a particular example, incident indicators for a call 104, which are not determined by a bot 120 may be assigned a null value and may be automatically assigned a relatively low and/or zero confidence level.

In another example, a bot 120 changing an incident indicator once, or more than once, may lead to a relatively low confidence level. For example, a bot 120 may change an incident type once, or more than once, as a caller on a call 104 may first mention a fire, then an injury, then a police-related incident, and the like. Similarly, a bot 120 may change a PSU assignment once, or more than once, as a caller on a call 104 mentions different information. Each situation may result in a relatively low confidence level for an incident type and/or a PSU assignment determined by a bot 120.

In yet a further example, an incident status being "Pending" for a given period of time may lead to a relatively low confidence level.

Such confidence levels may be determined via numerical algorithms while in other examples such confidence levels may be determined via machine learning algorithms, as described in more detail below.

In some examples, a confidence level may be provided in form of a percentage value that ranges from 0% to 100%, however a confidence level may be provided in any suitable format.

The device 102 may compare a confidence level of a bot-generated particular incident indicator to a low confidence condition to determine whether the bot-generated particular incident indicator meets the low confidence condition. In some examples, the low confidence condition may comprise a threshold confidence level, below which a confidence level is understood to indicate inaccuracy of an associated bot-generated particular incident indicator. Such a threshold confidence level may, for example, be a confidence level of 50%, 60%, 70%, among other possibilities. Such a low confidence condition may further be specific to an associated incident indicator; for example, incident type incident indicators may have a threshold confidence level of 50%, while status incident indicators may have a threshold confidence level of 60%.

In such an automated review mode, a human user 110 may be concurrently provided with incident indicators for a plurality of the calls 104 (and/or for one or more calls 104), at a respective display screen 112 (e.g., of a respective communication device 108) so that the human user 110 can review the incident indicators and intervene in some appropriate manner as describe hereafter.

In particular, the device 102, in response to detecting that a bot-generated particular incident indicator meets a low confidence condition, may change a rendered characteristic of the bot-generated particular incident indicator at the respective display screen 112 to indicate that the human user 110 should, and/or may need to, intervene. For example, an incident type incident indicator, associated with a call 104, and which is determined (or not) by a bot 120, that meets a low confidence condition may be changed to particular color and/or font, and/or may be depicted in a box, and/or highlighted in any suitable manner at a display screen 112, to indicate and/or visually indicate that the incident type incident indicator has met a low confidence condition. Furthermore, the rendered characteristic of the bot-generated particular incident indicator that is changed at the respective display screen 112, to indicate that the human user 110 should, and/or may need to, intervene, may change to indicate a particular confidence level. For example, a bot-generated particular incident indicator that has a confidence level of 70%, may be changed to a first color (e.g. yellow), while a bot-generated particular incident indicator that has a confidence level of 50%, may be changed to a second color (e.g. red), among other possibilities. Put another way, a rendered characteristic of the bot-generated particular incident indicator may be changed according to confidence intervals (e.g. a confidence level of a bot-generated particular incident indicator in a confidence interval of 50% to 70% may cause the rendered characteristic to be "yellow", whereas a confidence level of a bot-generated particular incident indicator in a confidence interval of below 50% may cause the rendered characteristic to be "red", and the like). As such, the human user 110 may manually assign and/or change an incident type associated with the call 104. However, the human user 110 may manually assign and/or change any suitable bot-generated incident indicator.

In conjunction with manually assigning and/or changing in incident indicator for a call 104, the human user 110 may be provided with one or more user-operable input mechanisms, such as electronic buttons and/or menu options, and the like, for reviewing a transcript of the call 104 and/or reviewing a geographic map of a region associated with the call 104 and/or reviewing details of an incident (e.g., one or more of which may be rendered at an associated display screen 112).

Similarly, in conjunction with manually assigning and/or changing an incident indicator for a call 104, a human user 110 may be provided with one or more user-operable input mechanisms for one or more of: reviewing audio of the call 104; and/or connecting to the on-going call 104 (e.g., to talk to a caller); and/or connecting to a PSU assigned to an associated incident; and the like. Such one or more user-operable input mechanisms may include, but are not limited to, electronic buttons and/or menu options, and the like. Furthermore, reviewing audio of the call 104 and/or connecting to the on-going call 104 and/or connecting to a PSU may occur via a speaker and/or microphone (e.g. as appropriate) associated with a communication device 108 (e.g., a headset worn by the human user 110). Hence, in some of these examples, the device 102 (e.g., and/or a bot 120) may cause audio of a call 104 to be recorded and/or the device 102 is understood to include components for connecting a communication device 108 to call 104 and/or to a communication device of a PSU (not depicted).

Figure 2:
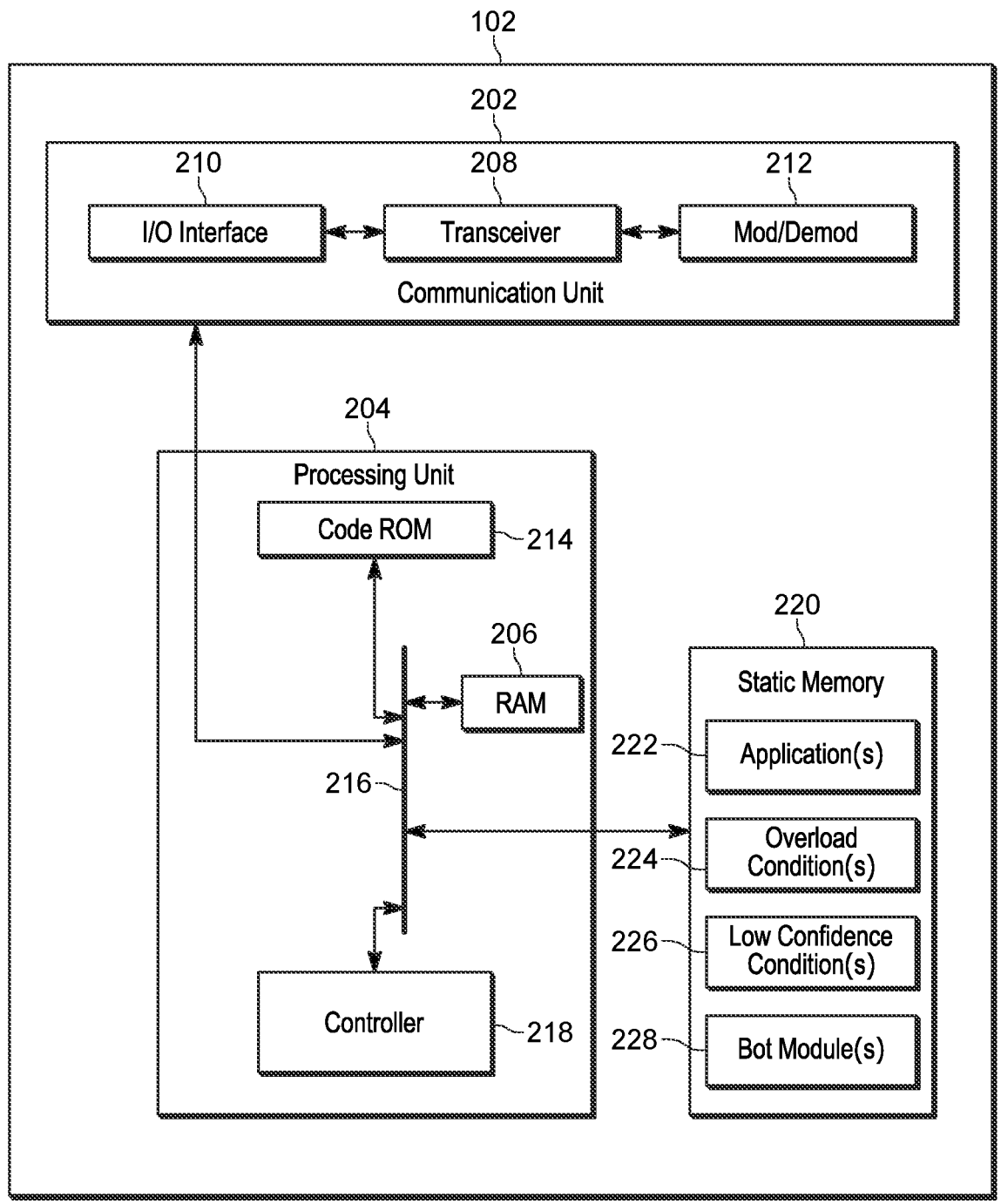
FIG. 2 is a device diagram showing a device structure of a computing device for transitioning a public-safety answering point to an automated review mode, in accordance with some examples.

Attention is next directed to FIG. 2, which depicts a schematic block diagram of an example of the device 102. In general, the device 102 may comprise one or more servers and/or one or more cloud computing devices, and the like, configured to communicate with the calling devices 106 and the communication devices 108. However, the device 102 may comprise a computing device such as a personal computer and/or a laptop computer, and the like. In some examples, the device 102 may be combined with one or more of communication devices 108. The device 102 may be located at a PSAP, and the like, and/or remote from a PSAP, and the like. Similarly, the device 102 may be located at a same facility (e.g., a PSAP) as one or more of the communication devices 108, and the like, and/or the device 102 and one or more of the communication devices 108 may be remote from each other.

As depicted, the device 102 comprises: a communication unit 202, a processing unit 204, a Random-Access Memory (RAM) 206, one or more wireless transceivers 208 (which may be optional), one or more wired and/or wireless input/output (I/O) interfaces 210, a combined modulator/demodulator 212, a code Read Only Memory (ROM) 214, a common data and address bus 216, a controller 218, and a static memory 220 storing at least one application 222. Hereafter, the at least one application 222 will be interchangeably referred to as the application 222. Furthermore, while the memories 206, 214 are depicted as having a particular structure and/or configuration, (e.g., separate RAM 206 and ROM 214), memory of the device 102 may have any suitable structure and/or configuration.

As shown in FIG. 2, the device 102 includes the communication unit 202 communicatively coupled to the common data and address bus 216 of the processing unit 204; hence, processing unit 204 and/or the controller 218 is understood to be communicatively coupled to the communication unit 202.

The processing unit 204 may include the code Read Only Memory (ROM) 214 coupled to the common data and address bus 216 for storing data for initializing system components. The processing unit 204 may further include the controller 218 coupled, by the common data and address bus 216, to the Random-Access Memory 206 and the static memory 220.

The communication unit 202 may include one or more wired and/or wireless input/output (I/O) interfaces 210 that are configurable to communicate with other components of the system 100. For example, the communication unit 202 may include one or more transceivers 208 and/or wireless transceivers for communicating with other suitable components of the system 100. Hence, the one or more transceivers 208 may be adapted for communication with one or more communication links and/or communication networks used to communicate with the other components of the system 100. For example, the one or more transceivers 208 may be adapted for communication with one or more of the Internet, a digital mobile radio (DMR) network, a Project 25 (P25) network, a terrestrial trunked radio (TETRA) network, a Bluetooth network, a Wi-Fi network, for example operating in accordance with an IEEE 802.11 standard (e.g., 802.11a, 802.11b, 802.11g), an LTE (Long-Term Evolution) network and/or other types of GSM (Global System for Mobile communications) and/or 3GPP ($3^{rd}$ Generation Partnership Project) networks, a 5G network (e.g., a network architecture compliant with, for example, the 3GPP TS 23 specification series and/or a new radio (NR) air interface compliant with the 3GPP TS 38 specification series) standard), a Worldwide Interoperability for Microwave Access (WiMAX) network, for example operating in accordance with an IEEE 802.16 standard, and/or another similar type of wireless network. Hence, the one or more transceivers 208 may include, but are not limited to, a cell phone transceiver, a DMR transceiver, P25 transceiver, a TETRA transceiver, a 3GPP transceiver, an LTE transceiver, a GSM transceiver, a 5G transceiver, a Bluetooth transceiver, a Wi-Fi transceiver, a WiMAX transceiver, and/or another similar type of wireless transceiver configurable to communicate via a wireless radio network.

The communication unit 202 may further include one or more wireline transceivers 208, such as an Ethernet transceiver, a USB (Universal Serial Bus) transceiver, or similar transceiver configurable to communicate via a twisted pair wire, a coaxial cable, a fiber-optic link, or a similar physical connection to a wireline network. The transceiver 208 may also be coupled to a combined modulator/demodulator 212.

The controller 218 may include ports (e.g., hardware ports) for coupling to other suitable hardware components of the system 100.

The controller 218 may include one or more logic circuits, one or more processors, one or more microprocessors, and/or the controller 218 may include one or more ASIC (application-specific integrated circuits) and one or more FPGA (field-programmable gate arrays), and/or another electronic device. In some examples, the controller 218 and/or the device 102 is not a generic controller and/or a generic device, but a device specifically configured to implement functionality for transitioning a public-safety answering point to an automated review mode. For example, in some examples, the device 102 and/or the controller 218 specifically comprises a computer executable engine configured to implement functionality for transitioning a public-safety answering point to an automated review mode.

The static memory 220 comprises a non-transitory machine readable medium that stores machine readable instructions to implement one or more programs or applications. Example machine readable media include a non-volatile storage unit (e.g., Erasable Electronic Programmable Read Only Memory ("EEPROM"), Flash Memory) and/or a volatile storage unit (e.g., random-access memory ("RAM")). In the example of FIG. 2, programming instructions (e.g., machine readable instructions) that implement the functional teachings of the device 102 as described herein are maintained, persistently, at the memory 220 and used by the controller 218, which makes appropriate utilization of volatile storage during the execution of such programming instructions.

Figure 3:
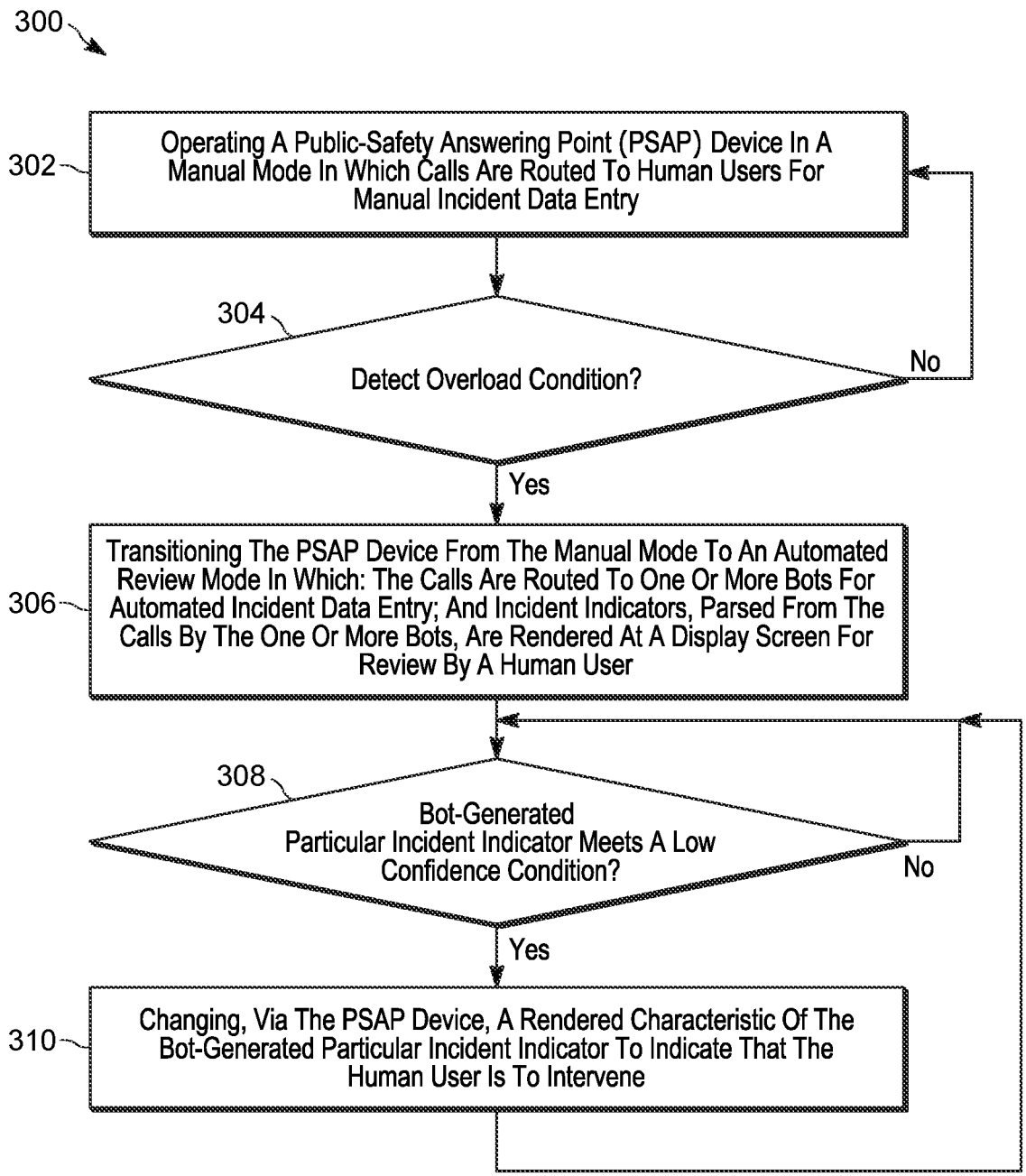
FIG. 3 is a flowchart of a method and/or process for transitioning a public-safety answering point to an automated review mode, in accordance with some examples.

In particular, the memory 220 stores instructions corresponding to the at least one application 222 that, when executed by the controller 218, enables the controller 218 to implement functionality for transitioning a public-safety answering point to an automated review mode, including but not limited to, the blocks of the process set forth in FIG. 3.

Furthermore, as depicted, the memory 220 stores one or more overload conditions 224, which may be used to determine whether to transition the PSAP device 102 from the manual mode to the automated review mode, as described herein. Alternatively, and/or in addition, the one or more overload conditions 224 may be incorporated into the application 222.

Furthermore, as depicted, the memory 220 stores one or more low confidence conditions 226, which may be used to determine when a rendered characteristic of a bot-generated particular incident indicator is to be changed to indicate that a human user 110 should, and/or may need to, intervene, as described herein. Alternatively, and/or in addition, the one or more low confidence conditions 226 may be incorporated into the application 222.

As depicted, the memory 220 further stores one or more bot modules 228, which, when implemented by the controller 218, may cause at least a portion of the controller 218 to be transformed into one or more automated call-answer engines and/or one or more bot engines to implement the one or more bots 120.

While not depicted, the memory 220 may further store one or more of a text-to-speech module, a speech-to-text module, an audio recording module, and the like, for respectively: converting text to speech (e.g., so that a bot 120 may "talk" on a call 104); converting speech to text (e.g., to generate a transcript of a call 104); and recording audio of a call 104. However, as depicted, such modules are understood to be components of the application 222 and/or the one or more bot modules 228.

In illustrated examples, when the controller 218 executes the one or more applications 222, the controller 218 is enabled to: operate a public-safety answering point (PSAP) device (e.g., the device 102) in a manual mode, in which calls are routed to human users for manual incident data entry; detect an overload condition, in which a number of the calls exceeds an ability of the human users to handle the calls; in response to detecting the overload condition, transition the PSAP device from the manual mode to an automated review mode, in which: the calls are routed to one or more bots for automated incident data entry; and incident indicators, parsed from the calls by the one or more bots, are rendered at a display screen for review by a human user; and in response to detecting that a bot-generated particular incident indicator meets a low confidence condition, change a rendered characteristic of the bot-generated particular incident indicator to indicate that the human user should, and/or may need to, intervene.

The application 222 may include programmatic algorithms, and the like, to implement functionality as described herein, which may include, but is not limited to, one or more programmatic algorithms.

Alternatively, and/or in addition to programmatic algorithms, the application 222 may include one or more machine learning algorithms to implement functionality as described herein, and which may include, but is not limited to, a machine learning algorithm. The one or more machine learning models and/or algorithms of the application 222 may include, but are not limited to: a deep-learning based algorithm; a neural network; a generalized linear regression algorithm; a random forest algorithm; a support vector machine algorithm; a gradient boosting regression algorithm; a decision tree algorithm; a generalized additive model; evolutionary programming algorithms; Bayesian inference algorithms, reinforcement learning algorithms, and the like. However, generalized linear regression algorithms, random forest algorithms, support vector machine algorithms, gradient boosting regression algorithms, decision tree algorithms, generalized additive models, and the like may be preferred over neural network algorithms, deep learning algorithms, evolutionary programming algorithms, and the like, in some public-safety environments. Any suitable machine learning algorithm and/or deep learning algorithm and/or neural network, and the like, is within the scope of the present specification.

In examples where the application 222 includes one or more machine learning algorithms, the device 102 may be operated in a learning mode to "teach" the one or more machine learning algorithms to determine when an overload condition 224 occurs at the device 102. Similarly, in such a learning mode, the one or more machine learning algorithms may be taught to determine when a bot-generated incident indicator meets a low confidence condition 226.

While the components of the devices 106, 108, are not described in detail, it is understood that components of such devices may be similar to the components of the device 102, but adapted for respective functionality thereof as described herein.

Attention is now directed to FIG. 3, which depicts a flowchart representative of a process 300 for transitioning a public-safety answering point to an automated review mode. The operations of the process 300 of FIG. 3 correspond to machine readable instructions that are executed by the device 102, and specifically the controller 218 of the device 102. In the illustrated example, the instructions represented by the blocks of FIG. 3 are stored at the memory 220 for example, as the application 222. The process 300 of FIG. 3 is one way in which the controller 218 and/or the device 102 and/or the system 100 may be configured. Furthermore, the following discussion of the process 300 of FIG. 3 will lead to a further understanding of the system 100, and its various components.

The process 300 of FIG. 3 need not be performed in the exact sequence as shown and likewise various blocks may be performed in parallel rather than in sequence. Accordingly, as previously mentioned, the elements of process 300 are referred to herein as "blocks" rather than "steps." The process 300 of FIG. 3 may be implemented on variations of the system 100 of FIG. 1, as well.

Furthermore, it is understood that the controller 218 and/or the device 102 may implement the process 300 via the application 222 as a process different from, but in conjunction with, implementation of the bot modules 228 and/or the bots 120 (e.g. the application 222 and/or the process 300 may comprise an application and/or process for supervising the bots 120). However, in other examples, aspects of the bots 120 may be integrated with the process 300.

At a block 302, the controller 218 and/or the device 102, operates in a manual mode and/or substantially manual mode, in which the calls 104 (e.g., received via the communication unit 202) are routed to the human users 110 for at least some portion of manual incident data entry. The manual mode and/or substantially manual mode may, in some examples, be aided by some automated entry. Such a manual mode and/or substantially manual mode is as described above (e.g., and is depicted) with respect to FIG. 1. Hereafter, references to a manual mode is understood to include a substantially manual mode, among other possibilities.

At a block 304, the controller 218 and/or the device 102 detects whether an overload condition 224 occurs. As has already been described, an overload condition 224 occurs when a number of the calls 104 exceeds an ability of the human users 110 to handle the calls 104. Hence, the device 102 is understood to monitor the number "N" of the calls 104, the number "M" of human users 110 and/or communication device 108, a call queue, a wait time of the call queue, and the like, to determine whether an overload condition 224 occurs.

When no overload condition 224 occurs (e.g., a "NO" decision at the block 304), the controller 218 and/or the device 102 continues to operate in the manual mode at the block 302.

However, in response to detecting an overload condition 224 (e.g., a "YES" decision at the block 304), at a block 306, the controller 218 and/or the device 102 transitions from the manual mode to an automated review mode, in which: the calls 104 are routed (e.g., via the communication unit 202) to one or more bots 120 for (e.g. substantially) automated incident data entry; and incident indicators, parsed from the calls 104 by the one or more bots 120, are rendered at a display screen 112 for review by a human user 110. An example of such routing is described below with respect to FIG. 4. It is understood that the automated review mode, described herein may be entirely automated, or initially automated with some manual review or entry only where the automated entry cannot be completed and/or the automated entry is completed with a bot-generated particular incident indicator meeting a low confidence condition 226 a low confidence, among other possibilities. Hence, put another way, the automated incident data entry described herein may include substantially automated incident data entry (though not all data entry may be entirely automated).

As understood herein, the term "parsed" may indicate that a bot 120 analyzes and/or parses text of a call 104, for example as generated using a speech-to-text module, to determine respective incident indicators; however, the term "parsed" may indicate that a bot 120 determines incident indicators associated with call 104 in any suitable manner.

In some examples, a human user 110, for example in a supervisor role, may be provided (e.g., at a respective display screen 112 of a respective communication device 108) with options to approve the transition to the automated review mode; in such examples, the transition to the automated review mode may not occur until approved by a human user 110, for example via operation of a respective input deice 114.

Alternatively, and/or in addition, the human users 110 may be provided with a visual and/or audible notification (e.g., at a respective display screen 112 and/or speaker), that a transition to the automated review mode is going to occur. Such human users 110 who are presently engaged in a call 104 in the manual mode may be provided with an option to finish such a call 104, or transition the call 104 to a bot 120 in the automated review mode.

Similarly, any calls 104 that are in a queue at the device 102 may be routed to a bot 120.

At a block 308, the controller 218 and/or the device 102 determines whether or not a bot-generated particular incident indicator meets a low confidence condition 226.

The block 308 may hence include the controller 218 and/or the device 102 assigning respective confidence levels to bot-generated incident indicators and comparing such confidence levels to threshold confidence levels of the one or more low confidence conditions 226, as described herein.

Any suitable scheme may be used to assign respective confidence levels to bot-generated incident indicators. For example, as has already been described, confidence levels may be based on a number of times a value of bot-generated incident indicators changes (e.g., such as an incident type), with the confidence level decreasing as a number of times a bot-generated incident indicators changes increases. However, confidence levels may be based on a transcript, and the like, of a call 104, with words and/or sentences that lead to bot-generated incident indicators being evaluated using natural language processing algorithms (e.g., which may be provided as modules of the application 222, and the like); hence, in these examples, a confidence level of a bot-generated incident indicator may be generated via such natural language processing algorithms. For example, certain words and/or phrases of the transcript, and the like, may be assigned a confidence level using such natural language processing algorithms to indicate whether a speech-to-text conversion of such words and/or phrases is accurate; for example, inaccuracies may be due to slurred speech of caller on a call 104, and the like. Similarly, certain words may raise or lower the confidence level, and certain combinations of words may raise or lower the confidence level, of one or more bot-generated incident indicators, for example as the call 104 progresses. Put another way, the confidence level may change as the call 104 progresses.

In other examples, a confidence level may be generated based on whether, or not, an address of a caller on a call 104 may be determined; for example, when an enhanced 911 system, and/or an automatic location identification system and the like fails to provide an address and/or provides only a general area of the call 104 (e.g., such as cell area), and/or a caller on a call 104 fails to provide an address, a relatively low and/or zero confidence level may be assigned to an address.

However, a confidence level for a bot-generated incident indicator may be determined in any suitable manner, such that the confidence level is indicative of an estimated accuracy of the bot-generated incident indicator. As previously mentioned, a confidence level may be provided in form of a percentage value that ranges from 0% to 100%. Similarly, a low confidence condition 226 may comprise a threshold confidence level provided in the form of a percentage value, such as 50%, 60%, 70%, among other possibilities; in these examples, a confidence level meeting a low confidence condition 226 may comprise a percentage value of a confidence level being less than (e.g., or equal to), a percentage value of a threshold confidence level of low confidence condition 226.

However a confidence level and/or a low confidence condition 226 may be provided in any suitable format.

In particular examples, a confidence level may not be assigned to a bot-generated particular incident indicator. Rather, a low confidence condition 226 may be provided in the form of a machine learning classifier, a neural network layer, and the like, and the controller 218 and/or the device 102 may determine whether or not a bot-generated particular incident indicator meets a low confidence condition 226 using such a machine learning classifier, neural network layer, and the like.

In some examples, a bot-generated particular incident indicator, which meets (e.g., or does not meet) a low confidence condition 226 may comprises one or more of: an incident type of an incident associated with a call 104 answered by the one or more bots 120; a status of the incident; a public-safety unit assignment to the incident; an address of the incident; amongst other possibilities. Indeed, any suitable incident indicator is within the scope of the present specification.

When a bot-generated particular incident indicator does not meet a low confidence condition 226 (e.g., a "NO" decision at the block 308), the controller 218 and/or the device 102 continues to monitor bot-generated particular incident indicators at the block 308 to determine whether a bot-generated particular incident indicator meets a low confidence condition 226.

However, in response to detecting that a bot-generated particular incident indicator meets a low confidence condition 226 (e.g., a "YES" decision at the block 308), at block 310, the controller 218 and/or the device 102 changes a rendered characteristic of the bot-generated particular incident indicator to indicate, and/or visually indicate, that a human user 110 should, and/or may need to, intervene, for example to manually assign and/or change the suitable bot-generated incident indicator.

A rendered characteristic of the bot-generated particular incident indicator that may be changed to indicate that a human user 110 should, and/or may need to, intervene, may include one or more of a color, a font, a size, a graphical indication, and the like, of the bot-generated particular incident indicator. In a particular example, described below with respect to FIG. 5, a box, and the like, may be placed around a bot-generated particular incident indicator to indicate that a bot-generated particular incident indicator meets a low confidence condition 226; alternatively the box, and/or another rendered characteristic of the bot-generated particular incident indicator may be changed according to confidence intervals, as described above.

Furthermore, in some examples, the process 300 may include the controller 218 and/or the device 102 providing a user-operable input mechanism, in which, responsive to activation an action is implemented, which assists a human user 110 in determining how to assign and/or change the suitable bot-generated incident indicator.

For example, such a user-operable input mechanism may include an electronic button, a menu option and/or various selectable options provided in response to a hover event at the bot-generated incident indicator (e.g., when a pointing device is used to hover at and/or select the bot-generated incident indicator).

In some of these examples, the process 300 may include the controller 218 and/or the device 102 providing a user-operable input mechanism, in which, responsive to activation, a transcript of a call 104 associated with the bot-generated particular incident indicator is rendered at a display screen 112, the call 104 being conducted by the one or more bots 120.

In other examples, the process 300 may include the controller 218 and/or the device 102 providing a user-operable input mechanism, in which, responsive to activation, audio of at least a portion of a call 104 associated with the bot-generated particular incident indicator is played at a speaker (e.g., at a headset and the like, the call 104 being conducted by the one or more bots 120). In some examples, the portion of a call 104 that is played at the speaker may comprise a portion of the call 104 that is used to determine whether a bot-generated particular incident indicator meets a low confidence condition 226, and/or the portion of a call 104 that is played at the speaker may comprise a portion of the call 104 that caused a bot-generated particular incident indicator to meet a low confidence condition 226.

In some of these examples, the process 300 may include the controller 218 and/or the device 102 providing a user-operable input mechanism, in which, responsive to activation, available details of an incident of a call 104 associated with the bot-generated particular incident indicator is rendered at a display screen 112, the call 104 being conducted by the one or more bots 120.

In yet further examples, the process 300 may include the controller 218 and/or the device 102 providing a user-operable input mechanism, in which, responsive to activation, a human user 110 is connected, and/or audibly connected, to an ongoing call 104 associated with the bot-generated particular incident indicator, the ongoing call having been initially answered by the one or more bots 120.

Such connections to an ongoing call 104 may include connecting to an ongoing voice call and/or connections to an ongoing message-based call (e.g., SMS message calls and/or MMS message calls and/or video calls, and the like).

In yet further examples, the process 300 may include the controller 218 and/or the device 102 providing a user-operable input mechanism, in which, responsive to activation, a human user 110 is connected, and/or audibly connected, to a PSU assigned to an incident associated with a call 104, the call 104 being conducted by the one or more bots 120. Such a connection may alternatively, and/or additionally, include connecting to a PSU using message-based calls.

In yet further examples, the process 300 may include the controller 218 and/or the device 102 providing a user-operable input mechanism, in which, responsive to activation, a geographic map is rendered at a display screen 112, the geographic map including at least one location related to a call 104 associated with the bot-generated particular incident indicator.

Indeed, any suitable information, in any suitable format, may be provided to a human user 110, which may assist the human user 110 in determining a more accurate value for a bot-generated particular incident indicator, which may be assigned and/or changed by the human user 110, for example, from a bot-generated value (e.g., which may include a null value) to a manually-received value.

Hence, the process 300 may include the controller 218 and/or the device 102 providing a user-operable input mechanism, in which, responsive to activation, input is received at an input device 114 to change the bot-generated particular incident indicator from a bot-generated value to a manually-received value.

In particular, the process 300 may include the controller 218 and/or the device 102: receiving, at an input device 114, input associated with the bot-generated particular incident indicator; and in response to receiving the input, activating a user-operable input mechanism to change the bot-generated particular incident indicator from one or more of a null value and a bot-generated value to a manually-received value.

In this manner, a human user 110 may change and/or update a bot-generated particular incident indicator.

In a particular example, a bot-generated particular incident indicator may comprise an indeterminate value, such as a null value, as described above. The process 300 may hence include the controller 218 and/or the device 102: providing a user-operable input mechanism, in which, responsive to activation, input is received at an input device to change the bot-generated particular incident indicator from the indeterminate value to a manually-received value, for example determined by a human user 110 and provided by the human user 110 via an input device 114, and the like.

The controller 218 and/or the device 102 may continue to monitor bot-generated particular incident indicators at the block 308 to determine whether a bot-generated particular incident indicator meets a low confidence condition 226.

While not depicted, the controller 218 and/or the device 102 may continue to implement the block 304 concurrently with the block 306, the block 308 and/or the block 310 and, in response to detecting that an overload condition 224 is no longer occurring (e.g., a "NO" decision at the block 304), the controller 218 and/or the device 102 may transition back to the manual mode at the block 302. Such a transition may occur upon approval by a supervisor (e.g., via a respective display screen 112 and input device 114), and furthermore human users 110 reviewing bot-generated incident indicator may be provided with a notification that a transition to the manual mode is to occur (e.g., via respective display screens 112).

It is further understood that in the manual mode, a human user 110 may typically handle a single call. In the automated review mode, incident indicators provided at a display screen 112, may be associated with one or more of a plurality of the calls 104 and a plurality of incidents, such that a human user 110 reviews the incident indicators for one or more of the plurality of the calls 104 and the plurality of incidents at any given time, typically without speaking to any one caller in the calls 104 (e.g. unless a user-operable input mechanism is actuated). In particular, a portion of a plurality of calls 104 may be for a same incident, and/or a portion of a plurality of calls 104 may be for a different incidents.

It is further understood that FIG. 1 provides an example of the block 302 of the process 300. Attention is next directed to FIG. 4, FIG. 5, FIG. 6, and FIG. 7 which provide examples of the block 304, the block 306, the block 308 and the block 310 of the process 300.

Figure 4:
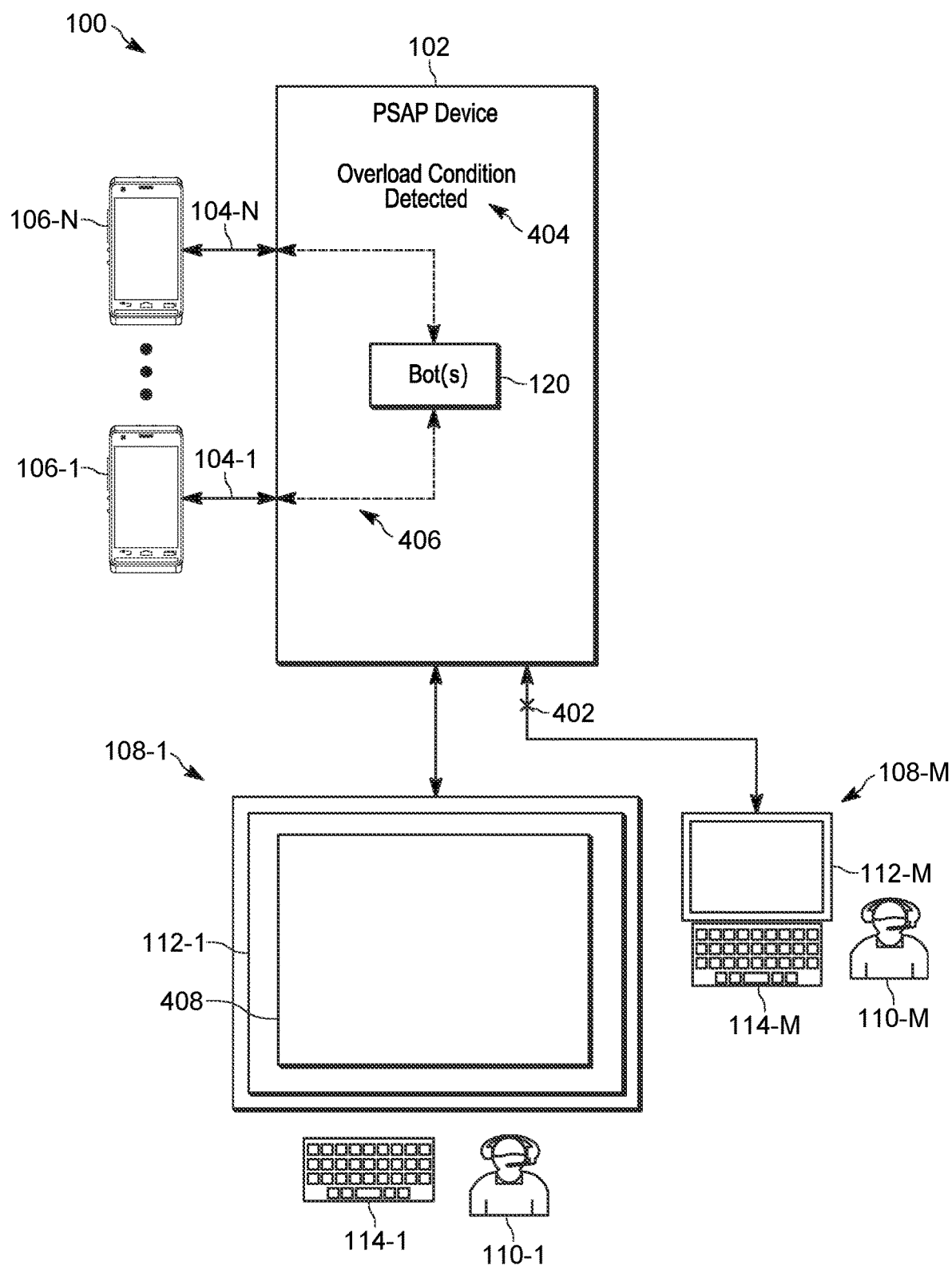
FIG. 4 depicts an example of transitioning a public-safety answering point to an automated review mode implemented in the system of FIG. 1, in accordance with some examples.

In particular, attention is next directed to FIG. 4, which is substantially similar to FIG. 1, with like components having like numbers. However, in FIG. 4, the one or more of the communication devices 108 may have gone offline, for example, as indicated by an indicator 402 at a communication link between the device 102 and the communication device 108-M. It is understood, however, in the example of FIG. 4 that at least the communication device 108-1 remains online.

As such, a number of the calls 104 is determined by the device 102 to exceeds an ability of the (e.g., remaining) human users 110 to handle the calls 104, and the device 102 hence detects (e.g., a "YES" decision at the block 304 of the process 300), an overload condition 224, as shown by an indicator 404.

As also depicted in FIG. 4, the device 102 transitions (e.g., at the block 306 of the process 300) from the manual mode shown in FIG. 1, to an automated review mode, in which the calls 104 are routed 406 to one or more of the bots 120.

As also depicted in FIG. 4, the display screen 112-1 of the communication device 108-1 is controlled to provide a call status monitor 408, at which incident indicators parsed from the calls 104 by the one or more bots 120, are for review by the human user 110-1. Such a call status monitor 408, as well as the block 308 and the block 310, are described with respect to FIG. 5, FIG. 6 and FIG. 7.

In particular, an example of the call status monitor 408 is depicted in more detail in FIG. 5, which is labelled a "Universal Status Monitor" in FIG. 5. It is understood in FIG. 5 that while the call status monitor 408 is depicted without the display screen 112-1, the call status monitor 408 is rendered at the display screen 112-1 and fields thereof are populated via the device 102 and/or the bots 120.

For example, with reference to FIG. 5, the call status monitor 408 may be provided in a tabular format, in which each row corresponds to a different call 104 answered by a bot 120. Columns of the call status monitor 408 may correspond to a particular incident indicator. Similar to the mechanism 116, a portion of the incident indicators may be automatically assigned and/or determined, such as an incident number (e.g., "Incident #") and/or a phone number. In particular, a call 104 is understood to be associated with an incident and an incident number may be assigned to call 104 by the device 102 and/or a bot 120. It is understood that, in FIG. 5, FIG. 6 and FIG. 7, the incident numbers of the calls 104 do not typically change.

However, another portion of the incident indicators are understood to be parsed and/or determined from the calls 104 by the one or more bots 120 for review by the human user 110-1. Such incident indicators, as depicted, may include, but are not limited to:

An incident type (e.g., "Type"), which indicates a type of an incident such as an accident ("ACC"), a fire ("FIRE"), a traffic stop ("TS"), or a noise complaint ("NC"), among other possibilities.

An incident priority (e.g., "Priority"), which may provide an indication of a severity and/or importance of an incident. Such a priority may be at least partially dependent on incident type; for example, a fire may have higher priority than a shoplifting incident; while as depicted all the incidents are assigned a highest priority of "1", in other examples, incidents may be assigned lower priorities, such as "2", "3" and the like.

A status of an incident (e.g., "Status") indicating whether or not a PSU has yet been assigned to an incident, with "Active" indicating such an assignment and "Pending" indicating that such an assignment has not yet occurred.

A PSU assigned to an incident (e.g., "Unit #") showing an identifier of a PSU assigned to an incident by a bot 120.

An address (e.g., "Address") associated with an incident.

However, any other suitable incident indicators and/or other information may be provided at the call status monitor 408. For example, as depicted, a timer (e.g., "Timer") is also provided indicating a length of a call 104 with a bot 120, as well as a phone status (e.g., "Phone Status") indicating whether a call 104 is in progress (e.g., "In progress"), ended (e.g., "Released") or in a format other than a phone call (e.g., "SMS"), and the like.

While not depicted, yet further information may be provided at the call status monitor 408 including, but not limited to, a unit status of a PSU assigned to an incident (e.g., indicating whether a PSU is assigned, en-route and/or on-scene), an acknowledgement unit status of the PSU assigned to an incident (e.g., indicating whether or not an assigned PSU has acknowledged an assignment), and the like.

Yet further information provided at the call status monitor 408 may include, but is not limited to, whether or not a call-taker, such as a human user 110, has also been engaged in a call 104, whether or not a dispatcher, such as a human user 110, has also been engaged in a call 104, and the like. Indeed, such examples illustrate that, while as depicted in FIG. 4, the communication device 108-1 has transitioned to an automated review mode, and the human user 110-1 has transitioned from a manual call-taker role to a bot supervisor role, in which the human user 110-1 reviews and/or manually corrects information determined by a bot 120; other human users 110, operating other communication devices 108, may continue to manually answer calls 104 and/or dispatch PSUs to incidents. However, in other examples, as described herein, one or more of the communication devices 108 may not have gone offline, but the number of calls 104 may lead to an overload condition 224, in which all the communication device 108 are in an automated review mode, and all the human users 110 are transitioned to bot supervisor roles.

As also depicted in FIG. 5, it is understood that the device 102 has determined (e.g., a "YES" decision occurs at the block 308 of the process 300) that various bot-generated particular incident indicators meet one or more of the low confidence conditions 226. As such, the device 102 changes a rendered characteristic of the various bot-generated particular incident indicator to indicate that the human user 110-1 should, and/or may need to, intervene.

For example, as depicted bot-generated incident indicators 500-1, 500-2, 500-3, 500-4, 500-5 (e.g., the indicators 500 and/or an indicator 500) are rendered with boxes surrounding them, which indicate that such indicators 500 may require intervention by the human user 110-1. Furthermore, the indicators 500-1, 500-2 are provided as question marks, indicating that null values and/or indeterminate values have been assigned by a bot 120, for example, as a bot 120 may not have been able to determine accurate (and/or any) values thereof. For example, for the indicator 500-1, an incident type was not determined, and for the indicator 500-2, an address was not determined; hence the indicators 500-1, 500-2 meet a low confidence condition 226 associated with a bot 120 not being able to determine a value thereof.

In contrast, a bot 120 determined values for the indicators 500-3, 500-4, such as, respectively, an incident type and an assigned PSU identifier; however, the device 102 has determined that values for the indicators 500-3, 500-4 meet a low confidence condition 226. For example, the incident type of the indicator 500-3, which presently is for an accident, may not be accurate and/or the assigned PSU of the indicator 500-4, which presently is for a firefighter PSU, may not be accurate.

Similarly, the indicator 500-5 has a determine value of "Pending", which may indicate that a PSU unit has not been assigned to an associated incident, and a PSU unit, which a bot 120 attempted to assign to the associated incident may not be responding to the assignment; a delay in the assignment of a PSU may also be indicated by the associated time (e.g., the associated call 104 has been in progress for 11 minutes and 12 seconds).

It is further noted that the calls 104 of the call status monitor 408 are organized according to the indicators 500. For example, calls 104 associated with the indicators 500-1, 500-2 having null values, and the like are in a first group and labelled as requiring "Action", with a number "2" of the calls 104 also indicated; in particular, an "Action" is understood to be required as, without a determined incident type and/or a determined address, an appropriate PSU cannot be assigned to an associated incident and/or dispatched to an associated incident. Hence, in some examples, such as for the calls 104 associated with the indicators 500-1, 500-2, a response to an incident may not proceed until low confidence issues are resolved.

Similarly, calls 104 associated with the indicators 500-3, 500-4, 500-5 having determined values that meet a low confidence condition 226 are in a second group and labelled as requiring "Attention", with a number "3" of the calls 104 also indicated; in particular, "Attention" may be required by a human user 110 to better determine values for the indicators 500-3, 500-4, 500-5. However, in contrast to the calls 104 associated with the indicators 500-1, 500-2, PSUs may be dispatched to the calls 104 associated with the indicators 500-3, 500-4, 500-5 as incident types and addresses, etc., are determined, though such PSUs may be dispatched erroneously and/or may not acknowledge such an assignment. Hence, in some examples, such as for the calls 104 associated with the indicators 500-3, 500-4, 500-5, a response to an incident may proceed without resolving low confidence issues, however information stored and/or provided at the PSAP device 102, and/or to a PSU, may not be entirely accurate as a result.

Similar, the call status monitor 408 also indicates calls 104 for which no indicators meet a low confidence condition 226, for example labeled as "Other", along with a number "2" of such calls 104, which may indicate that, for such calls 104, no user attention or action may be required and/or suggested, and hence a response to an incident may proceed for such calls 104 (e.g., without intervention by a human user 110).

As will next be explained, the human user 110-1 may operate the input device 114-1 to select an indicator 500, which may cause one or more a transcript and/or audio of an associated call 104 to be provided, and/or which may cause a geographic map associated with a location of a call 104 to be provided, and/or which may cause details of an incident to be provided, and/or which may allow the human user 110 to connected, and/or audibly connected, to an ongoing call 104 and/or connect to an assigned PSU. For example, as depicted, a cursor 502 may be used to select and/or hover at an indicator 500 (e.g., as depicted, the indicator 500-1); such a hover event may correspond to a user-operable input mechanism, which may be activated (e.g., upon "clicking" a point device controlling the cursor 502), to activate an associated action, and/or to change and/or assign a value of an indicator, and the like.

Figure 6:
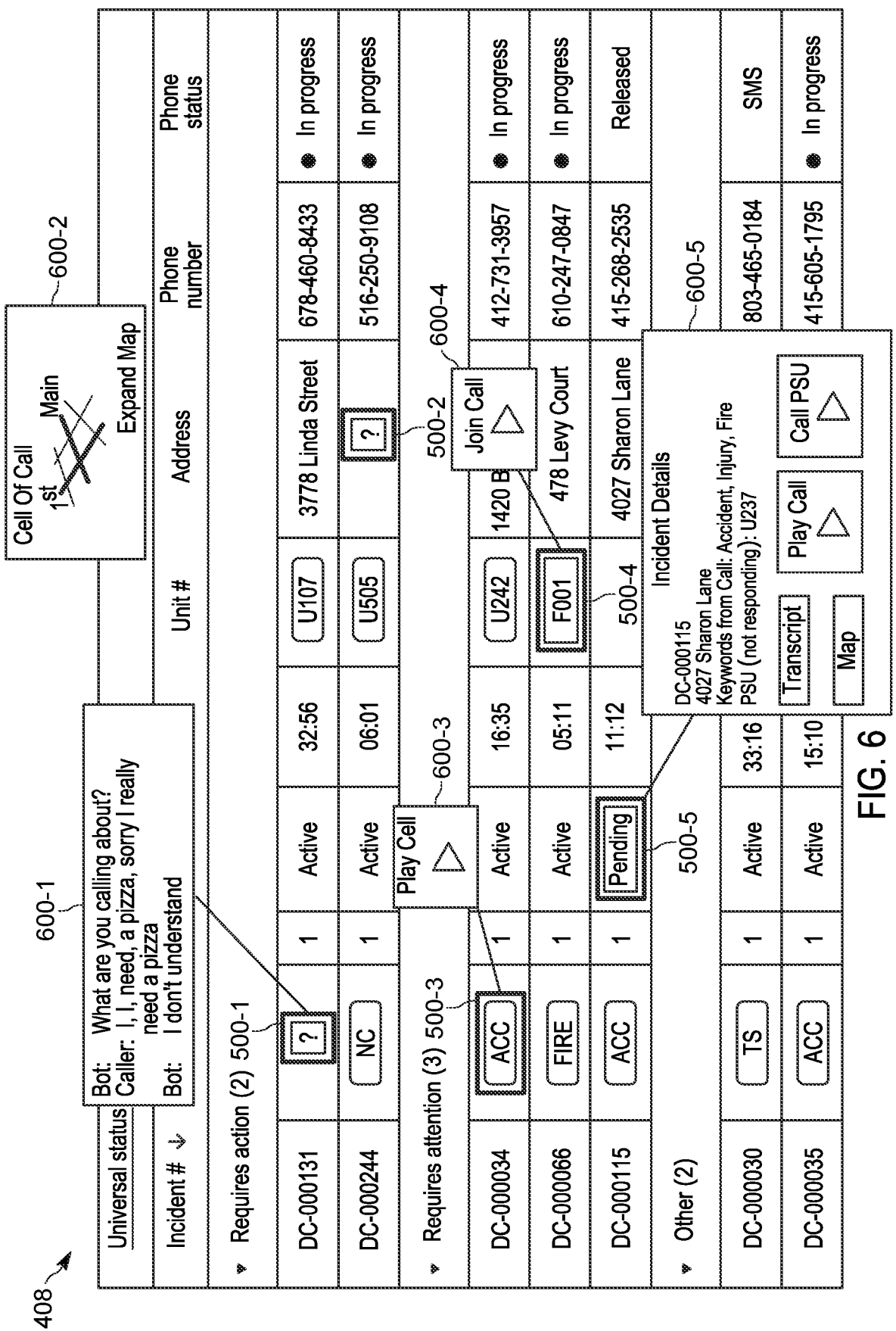
FIG. 6 depicts the call status monitor of FIG. 5 with various actions occurring to assist a human user in reviewing the calls, in accordance with some examples.

For example, attention is next directed to FIG. 6, which depicts various actions that may occur at the call status monitor 408 upon activation of a user-operable input mechanism by the human user 110-1, for example a "click" on an indicator 500 using a pointing device controlling the cursor 502 and the like, though such actions may alternatively occur via electronic buttons, a menu, a voice command, and the like. For example, as depicted, various dialogue boxes 600-1, 600-2, 600-3, 600-4, 600-5 (e.g., dialogue boxes 600 and/or a dialogue box 600) are depicted, each associated with a respective indicator 500-1, 500-2, 500-3, 500-4, 500-5. FIG. 6 is further described with respect to FIG. 7, which shows the call status monitor 408 after the human user 110-1 has assigned values to the indicator 500-1, 500-2, and/or changed the indicators 500-3, 500-4, 500-5.

In particular, when a user-operable input mechanism associated with the indicator 500-1 is selected, a dialogue box 600-1 is rendered at the display screen 112-1 showing a transcript of an associated call 104. The transcript indicates that a caller says the word "Pizza", which may be a code word for domestic violence. Hence, the human user 110-1 may change the indicator 500-1 to indicate an incident type of domestic violence (e.g., "DV"), as shown in FIG. 7.

Similarly, when a user-operable input mechanism associated with the indicator 500-2 is selected, a dialogue box 600-2 is rendered at the display screen 112-1 showing a geographic map of an area and/or location of an associated call 104. As depicted, the geographic map shows a cell of the associated call 104 and indicates a major intersection of $1^{st}$ and Main (e.g., which may be streets). Hence, the human user 110-1 may change the indicator 500-2 to indicate an address of $1^{st}$ and Main, as shown in FIG. 7. In some examples, with reference back to FIG. 6, the geographic map may be provided at the dialogue box 600-2 with an option to expand the geographic map.

Similarly, when a user-operable input mechanism associated with the indicator 500-3 is selected, a dialogue box 600-3 is rendered at the display screen 112-1 that includes an electronic button (e.g., the depicted triangle) that, when actuated, plays recorded audio of the associated call 104. Hence, the human user 110-1 may activate the electronic button and listen to the audio; however, in this example, with reference to FIG. 7, the human user 110-1 does not change the incident type of an accident, but rather may confirm (e.g., via any suitable input mechanism), that the incident type of the indicator 500-3 is accurate, thereby removing the box from the indicator 500-3 without otherwise changing the indicator 500-3. Hence, in some examples, a human user 110 may confirm that an incident indicator, that was determined to meet a low confidence condition 226, has been accurately determined by a bot 120.

Similarly, when a user-operable input mechanism associated with the indicator 500-4 is selected, a dialogue box 600-4 is rendered at the display screen 112-1 that includes an electronic button (e.g., the depicted triangle) that, when actuated, connects, and/or audibly connects, the human user 110 to an ongoing associated call 104 (and/or connects the human user 110 to an ongoing associated message based call 104). Hence, the human user 110-1 may activate the electronic button and join the ongoing associated call 104 to talk to a caller and/or communicate with a caller via text messaging, and the like. For example, the human user 110-1 may determine, in conversation with the caller, that while an associated incident type has been determined by a bot 120 to be a fire (e.g., "FIRE"), with a firefighter PSU (e.g., "F001") assigned thereto, the incident type is really a medical emergency. As such, with reference to FIG. 7, the human user 110-1 may change the associated incident type to a medical incident type (e.g., "MED") and assign an EMT PSU (e.g., "M001") to the call 104. Such an example illustrates that while the device 102 may determine that a given bot-generated particular incident indicator for a call 104 meets a low confidence condition 226, other incident indicators for the call 104 may be modified and/or changed and/or assigned by a human user 110.

Similarly, when a user-operable input mechanism associated with the indicator 500-5 is selected, a dialogue box 600-5 is rendered at the display screen 112-1 showing details of an incident of an associated call 104. For example, as depicted, the dialogue box 600-5 includes the incident number, an associated address, a PSU that a bot 120 has attempted to assign to the associated incident (e.g., "U237") along with a status of the PSU, which, as depicted, is not responding to the assignment. However, any suitable available incident information may be provided at the dialogue box 600-5.

As depicted, the dialogue box 600-5 may optionally include electronic buttons for accessing a transcript, and/or audio of the associated call 104 (e.g., similar to the dialogue boxes 600-1, 600-3), a geographic map of a location of the associated call 104 (e.g., similar to the dialogue box 600-2), and/or, as depicted, an electronic button for calling the assigned PSU. As the associated call 104 has ended, however, there is no electronic button for joining the associated call 104 (e.g., the phone status of the associated call is "Released); however, in examples where an associated call 104 is ongoing, the dialogue box 600-5 may include an electronic button for joining the associated call 104. However, the various electronic buttons at the dialogue box 600-5 may be optional.

Regardless, the human user 110-1 may review and/or access information provided via the dialogue box 600-5, and change the indicator 500-5 to assign another PSU (e.g., "U737") to the associated incident, as shown in FIG. 7, which may acknowledge the assignment (e.g., and hence, in FIG. 7, the status has changed to "Active").

As is also depicted in FIG. 7, as the various indicators 500 that met a low confidence condition 226 were resolved, all the calls 104 are now categorized as "Other". However, as more calls 104 are received, and/or as associated incident indicators are determined to meet a low confidence condition 226 are determined, the device 102 updates the call status monitor 408 accordingly.

It is further understood that while specific indicators 500 were described with respect to the example of FIG. 5, FIG. 6 and FIG. 7, any suitable incident indicators are within the scope of the present specification, and furthermore the call status monitor 408, and the like, may be adapted to include any suitable incident indicators. Furthermore, while not depicted in the example of FIG. 5, FIG. 6 and FIG. 7, the call status monitor 408 and/or the communication device 108-1 may include any suitable mechanism for reviewing any suitable incident indicators, and not just the specific indicators 500 that were determined to meet a low confidence condition 226. For example, the call status monitor 408 and/or the communication device 108-1 may receive input at the input device 114-1 and/or a microphone via actuation of buttons, electronic buttons, pull-down menu options, and/or receipt of voice commands, and the like, to select an incident indicator to review, which may cause the communication device 108-1 to provide any suitable associated information, such as a transcript, recorded audio of a call 104, a geographic map, and the like, similar to as described above, and/or cause a human user 110 to join a call 104 and/or a call to a PSU, as described above, among other possibilities (e.g. notes and/or comments associated with a call 104 and the like).

It is understood that while the call status monitor 408 of FIG. 4, FIG. 5, FIG. 6, and FIG. 7 are described herein with respect to block 308 and block 310 of the process 300, block 308 and block 310 of the process 300 may additionally, or alternatively be implemented, in some examples, entirely separate and independent of block 302, block 304, and block 306 of the process 300. In particular, in some examples, block 308 and block 310 of the process 300 may be implemented in an automated environment that never, or rarely, operates in a manual mode, and never or rarely transitions to or from a manual mode of entry. Put another way, the call status monitor 408 of FIG. 4, FIG. 5, FIG. 6, and FIG. 7 may be a default mode of operation of the PSA device 102, with a transition to the manual mode depicted in FIG. 1 occurring never, or rarely.

As should be apparent from this detailed description above, the operations and functions of electronic computing devices described herein are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, electronically encoded video, electronically encoded audio, etc., and cannot detect an overload condition, in which a number of calls at a PSAP device exceeds an ability of the human users to handle the calls, and/or change, via the PSAP device, a rendered characteristic of a bot-generated particular incident indicator to indicate that a human user should, and/or may need to, intervene, among other features and functions set forth herein).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including", "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through intermediate elements or devices via an electrical element, electrical signal or a mechanical element depending on the particular context.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
   operating a public-safety answering point (PSAP) device in a manual mode, in which calls are routed to human users for manual incident data entry;
   detecting, at the PSAP device, an overload condition, in which a number of the calls exceeds an ability of the human users to handle the calls;
   in response to detecting the overload condition, transitioning the PSAP device from the manual mode to an automated review mode, in which: the calls are routed to one or more bots for automated incident data entry; and incident indicators, parsed from the calls by the one or more bots, are rendered at a display screen for review by a human user; and
   in response to detecting that a bot-generated particular incident indicator meets a low confidence condition, changing, via the PSAP device, a rendered characteristic of the bot-generated particular incident indicator to indicate that the human user is to intervene.

2. The method of claim 1, wherein the bot-generated particular incident indicator which meets the low confidence condition comprises one or more of:
   an incident type of an incident associated with a call answered by the one or more bots;
   a status of the incident;
   a public-safety unit assignment to the incident; and
   an address of the incident.

3. The method of claim 1, further comprising:
   providing, via the PSAP device, a user-operable input mechanism, in which, responsive to activation, a transcript of a call associated with the bot-generated particular incident indicator is rendered at the display screen, wherein the call was conducted by the one or more bots.

4. The method of claim 1, further comprising:
   providing, via the PSAP device, a user-operable input mechanism, in which, responsive to activation, audio of at least a portion of a call associated with the bot-generated particular incident indicator is played at a speaker, wherein the call was conducted by the one or more bots.

5. The method of claim 1, further comprising:
   providing, via the PSAP device, a user-operable input mechanism, in which, responsive to activation, a human user is one or more of connected, and audibly connected, to an ongoing call associated with the bot-generated particular incident indicator, wherein the ongoing call was answered by the one or more bots.

6. The method of claim 1, further comprising:
   providing, via the PSAP device, a user-operable input mechanism, in which, responsive to activation, a geographic map is rendered at the display screen, the geographic map including at least one location related to a call associated with the bot-generated particular incident indicator.

7. The method of claim 1, further comprising:
   providing, via the PSAP device, a user-operable input mechanism, in which, responsive to activation, input is received at an input device to change the bot-generated particular incident indicator from a bot-generated value to a manually-received value.

8. The method of claim 1, further comprising:
   receiving, at an input device, via the PSAP device, input associated with the bot-generated particular incident indicator; and
   in response to receiving the input, activating a user-operable input mechanism to change the bot-generated particular incident indicator from one or more of a null value and a bot-generated value to a manually-received value.

9. The method of claim 1, wherein the bot-generated particular incident indicator comprises an indeterminate value, and the method further comprises:
providing, via the PSAP device, a user-operable input mechanism, in which, responsive to activation, input is received at an input device to change the bot-generated particular incident indicator from the indeterminate value to a manually-received value.

10. The method of claim 1, wherein:
in the manual mode, the human user handles a single call at any given time; and
in the automated review mode, the incident indicators are associated with one or more of a plurality of the calls and a plurality of incidents, such that the human user reviews the incident indicators for one or more of the plurality of the calls and the plurality of incidents at any given time.

11. A public-safety answering point (PSAP) device comprising:
a communication unit; and
a controller communicatively coupled to the communication unit, the controller configured to:
operate in a manual mode, in which calls, received via the communication unit, are routed to human users for manual incident data entry;
detect an overload condition, in which a number of the calls exceeds an ability of the human users to handle the calls;
in response to detecting the overload condition, transition from the manual mode to an automated review mode, in which: the calls are routed, via the communication unit, to one or more bots for automated incident data entry; and incident indicators, parsed from the calls by the one or more bots, are rendered at a display screen for review by a human user; and
in response to detecting that a bot-generated particular incident indicator meets a low confidence condition, change a rendered characteristic of the bot-generated particular incident indicator to indicate that the human user is to intervene.

12. The PSAP device of claim 11, wherein the bot-generated particular incident indicator which meets the low confidence condition comprises one or more of:
an incident type of an incident associated with a call answered by the one or more bots;
a status of the incident;
a public-safety unit assignment to the incident; and
an address of the incident.

13. The PSAP device of claim 11, wherein the controller is further configured to:
Provide a user-operable input mechanism, in which, responsive to activation, a transcript of a call associated with the bot-generated particular incident indicator is rendered at the display screen, wherein the call was conducted by the one or more bots.

14. The PSAP device of claim 11, wherein the controller is further configured to:
provide a user-operable input mechanism, in which, responsive to activation, audio of at least a portion of a call associated with the bot-generated particular incident indicator is played at a speaker, wherein the call was conducted by the one or more bots.

15. The PSAP device of claim 11, wherein the controller is further configured to:
provide a user-operable input mechanism, in which, responsive to activation, a human user is one or more of connected, and audibly connected, to an ongoing call associated with the bot-generated particular incident indicator, wherein the ongoing call was answered by the one or more bots.

16. The PSAP device of claim 11, wherein the controller is further configured to:
provide a user-operable input mechanism, in which, responsive to activation, a geographic map is rendered at the display screen, the geographic map including at least one location related to a call associated with the bot-generated particular incident indicator.

17. The PSAP device of claim 11, wherein the controller is further configured to:
provide a user-operable input mechanism, in which, responsive to activation, input is received at an input device to change the bot-generated particular incident indicator from a bot-generated value to a manually-received value.

18. The PSAP device of claim 11, wherein the controller is further configured to:
receive, at an input device, input associated with the bot-generated particular incident indicator; and
in response to receiving the input, activate a user-operable input mechanism to change the bot-generated particular incident indicator from one or more of a null value and a bot-generated value to a manually-received value.

19. The PSAP device of claim 11, wherein the bot-generated particular incident indicator comprises an indeterminate value, and the controller is further configured to:
Provide a user-operable input mechanism, in which, responsive to activation, input is received at an input device to change the bot-generated particular incident indicator from the indeterminate value to a manually-received value.

20. The PSAP device of claim 11, wherein:
in the manual mode, the human user handles a single call at any given time; and
in the automated review mode, the incident indicators are associated with one or more of a plurality of the calls and a plurality of incidents, such that the human user reviews the incident indicators for one or more of the plurality of the calls and the plurality of incidents at any given time.

* * * * *